Figure 1:
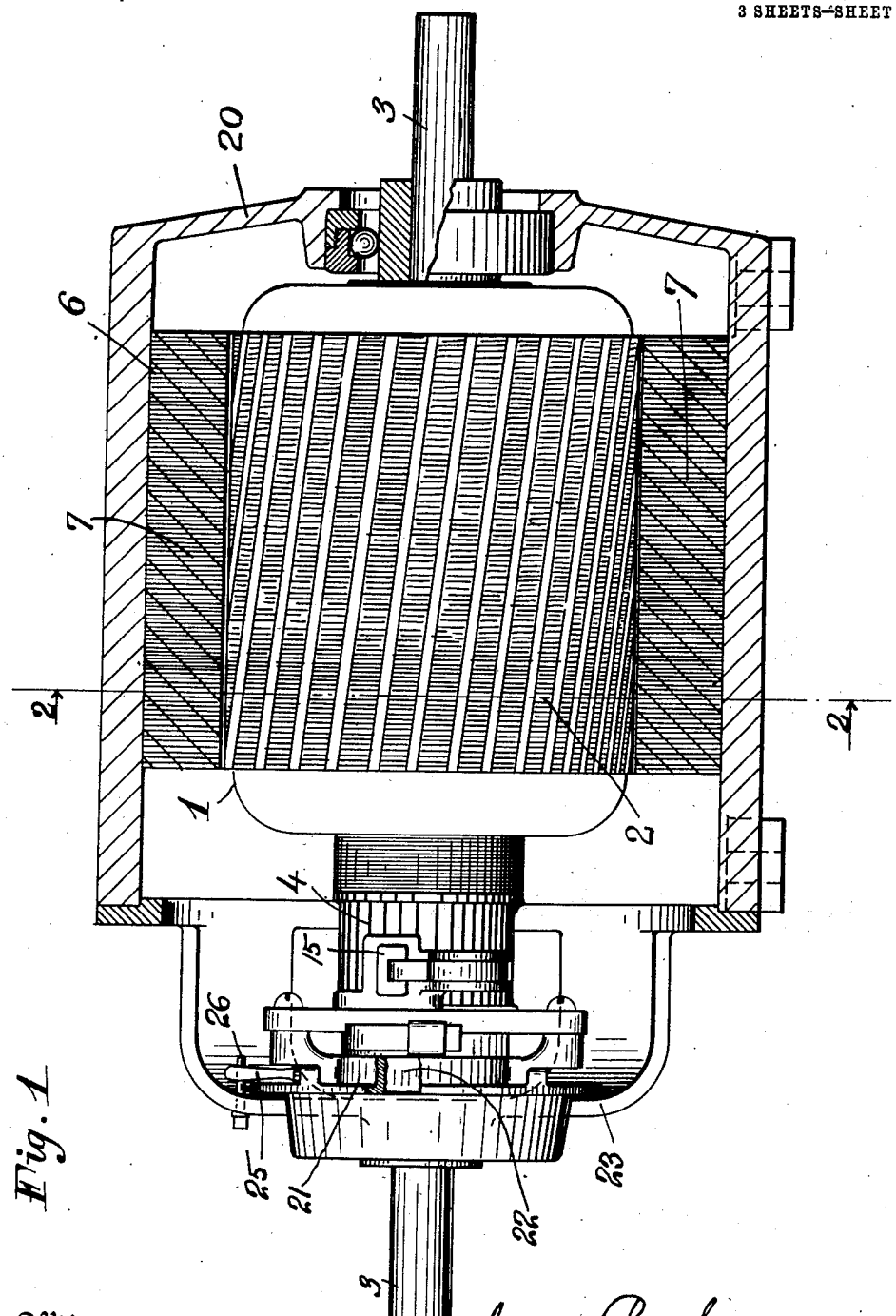

J. BURKE.
UNIVERSAL MOTOR.
APPLICATION FILED SEPT. 9, 1909.

1,053,940.

Patented Feb. 18, 1913.
3 SHEETS—SHEET 1.

Witnesses
James Burke Inventor
By his Attorneys
Edwards, Sager + Wooster.

J. BURKE.
UNIVERSAL MOTOR.
APPLICATION FILED SEPT. 9, 1909.

1,053,940.

Patented Feb. 18, 1913.

3 SHEETS—SHEET 2.

Witnesses
A. F. Schneider
Geo. N. Kerr

James Burke Inventor
By his Attorneys
Edwards, Sager & Wooster

J. BURKE.
UNIVERSAL MOTOR.
APPLICATION FILED SEPT. 9, 1909.

1,053,940.

Patented Feb. 18, 1913.

3 SHEETS—SHEET 3.

UNITED STATES PATENT OFFICE.

JAMES BURKE, OF ERIE, PENNSYLVANIA, ASSIGNOR TO BURKE ELECTRIC COMPANY, A CORPORATION OF PENNSYLVANIA.

UNIVERSAL MOTOR.

1,053,940.   Specification of Letters Patent.   Patented Feb. 18, 1913.

Application filed September 9, 1909. Serial No. 516,898.

*To all whom it may concern:*

Be it known that I, JAMES BURKE, a citizen of the United States, residing at Erie, in the county of Erie and State of Pennsylvania, have invented certain new and useful Improvements in Universal Motors, of which the following is a full, clear, and exact specification.

This invention relates to electric motors, and more particularly relates to an electric motor which is adapted to be actuated by either single phase alternating currents or direct currents, and to a method of varying the speed and changing the direction of rotation of the motor when supplied with alternating current of the same voltage.

It has heretofore been proposed to employ series motors of the direct current type in connection with a single phase alternating current for generating power. However, such prior devices have not been successful to any such degree as to render them commercially satisfactory. Such prior motors may be grouped into two classes, the first class embodying motors which, on account of inherent defects, such as difficulties in regulation, injurious sparking of the brushes, excessive heating and low efficiencies, are of practically no commercial value; the second class comprising those motors which necessitate additional parts, such as high resistance leads in the armature windings, complicated auxiliary windings in the field, extra brushes or sets of brushes, and the like, render the cost of materials and of assembling the complete motor prohibitive for general commercial use, and at best are not well adapted for ordinary commercial conditions. Furthermore, all such prior motors, so far as I am aware, are incapable of yielding the same speed of rotation for either a single phase alternating current or a direct current under conditions of substantially the same impressed potential and equal loads.

According to my invention, my motor is capable of being actuated either by single phase alternating current or by direct current of the same applied voltage, and is capable of giving the same speed under either current. Thus, one of my motors may be applied to any commercial alternating or direct current circuit without the use of any accessory apparatus or any change of adjustment by simply applying the alternating or direct current voltage to its terminals, and will in either case give the same speed and high torque; my motor is capable of being operated at a high efficiency for either character of current, and may be readily regulated without auxiliary devices. Furthermore, my motor is free from all injurious sparking of the brushes and all excessive heating and requires no additional parts, such as resistance leads, auxiliary field windings, or extra brushes. The above highly advantageous results attained by my motor, are substantially independent of the number of cycles of the single phase alternating current.

A salient feature of my arrangement and construction, which is of great utility, is that under conditions of the same applied potential and equal load, substantially the same speed of rotation is attained when said motor is supplied by a single phase alternating current or by a direct current, and at substantially the maximum efficiency for either character of current.

My preferred form of motor is provided with distributed poles in the stator, the alternating poles being of opposite polarity, and by avoiding pole projections, I obtain a uniform air gap between the stator core and the rotor core. In my motor the number of rotor turns are high relatively to the stator turns, being, in fact, preferably twice the number of stator turns; these turns are connected by the commutator bars in continuous series as a distributed winding and each brush spans two commutator bars, thus short-circuiting a portion of the winding under the brush and providing two paths in parallel for the rotor current; moreover, the number of poles are not commensurable with the number of slots carrying rotor coils, there being, for example, twenty-two rotor slots and six stator or field magnet poles, thus providing a region in which the flux through the rotor is not sharply defined with reference to its coils; moreover, the field winding is distributed in a stator having twenty-four slots, the stator coils being placed so that salient neutral core projections lie between consecutive poles. These structural features prevent the sharp variations of electromotive force which are further reduced by the rotor slots lying at an angle to the axis of rotation and to the plane of the field magnet poles. The aggregate result of this structure is to permit an unusually wide range of brush position without sparking.

My invention further provides for a definite brush position rendered possible by the structure above referred to which not only permits wide variation of speed with different brush adjustments, but admits of a certain definite brush adjustment at which the motor will run with large torque at the same speed under applied alternating current or direct current of the same voltage; this is a distinctively new feature in motor operation and one of great industrial advantage as it permits the same motor to be applied without any change whatever to commercial circuits whether alternating or direct with equivalent results.

More specifically, the stator of my motor embodies a plurality of coils disposed in slots in a laminated field frame, the rotor embodying a plurality of coils similarly disposed in slots in the laminated rotor core, said stator coils and said rotor coils being connected in series by means of a commutating device and suitable brushes. The rotor winding of my motor is series-wound, each slot containing parts of two coils of many turns each, the armature having two circuits from one brush to the other each being equal in number of turns to the stator turns. The width of the brushes is such as to inter-connect two bars of the commutator, whereby each brush short-circuits each coil in succession.

Other features of my invention may be more fully understood from the following description and the accompanying drawings, in which—

Figure 3:
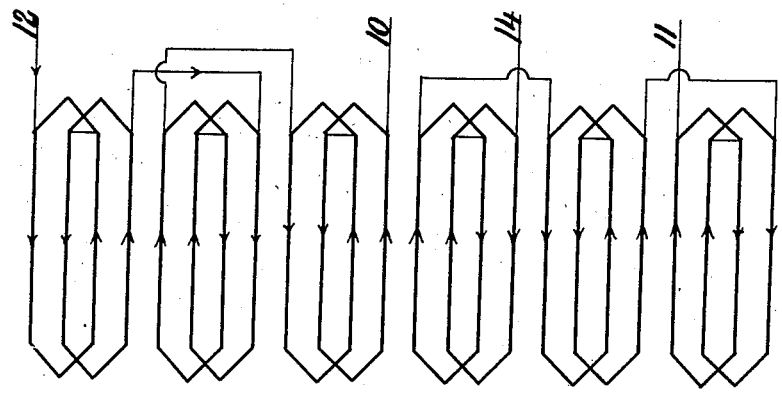
Figure 2:
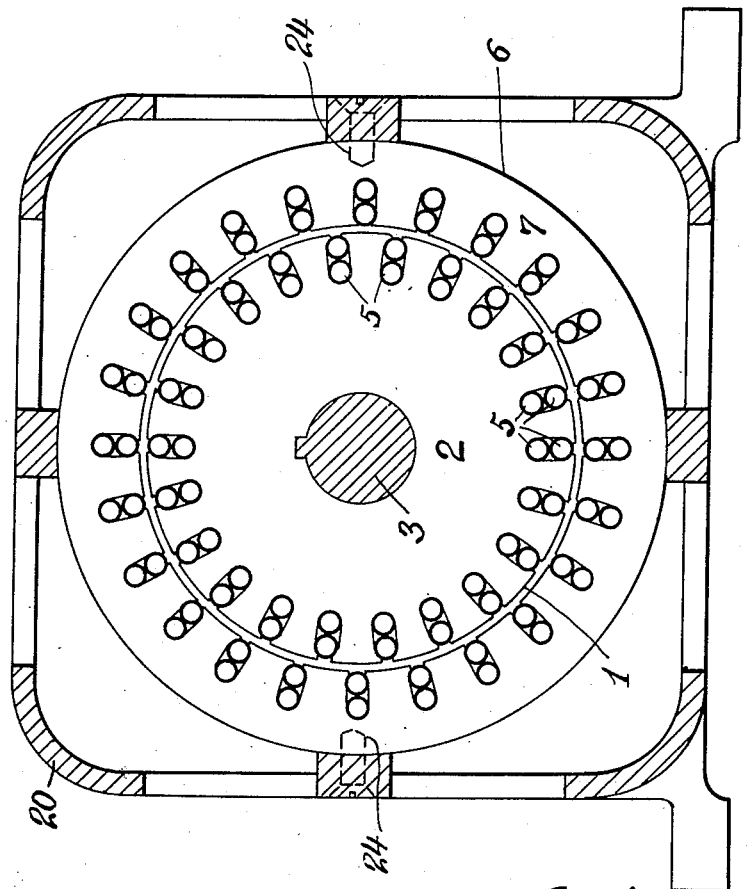
Figure 4:
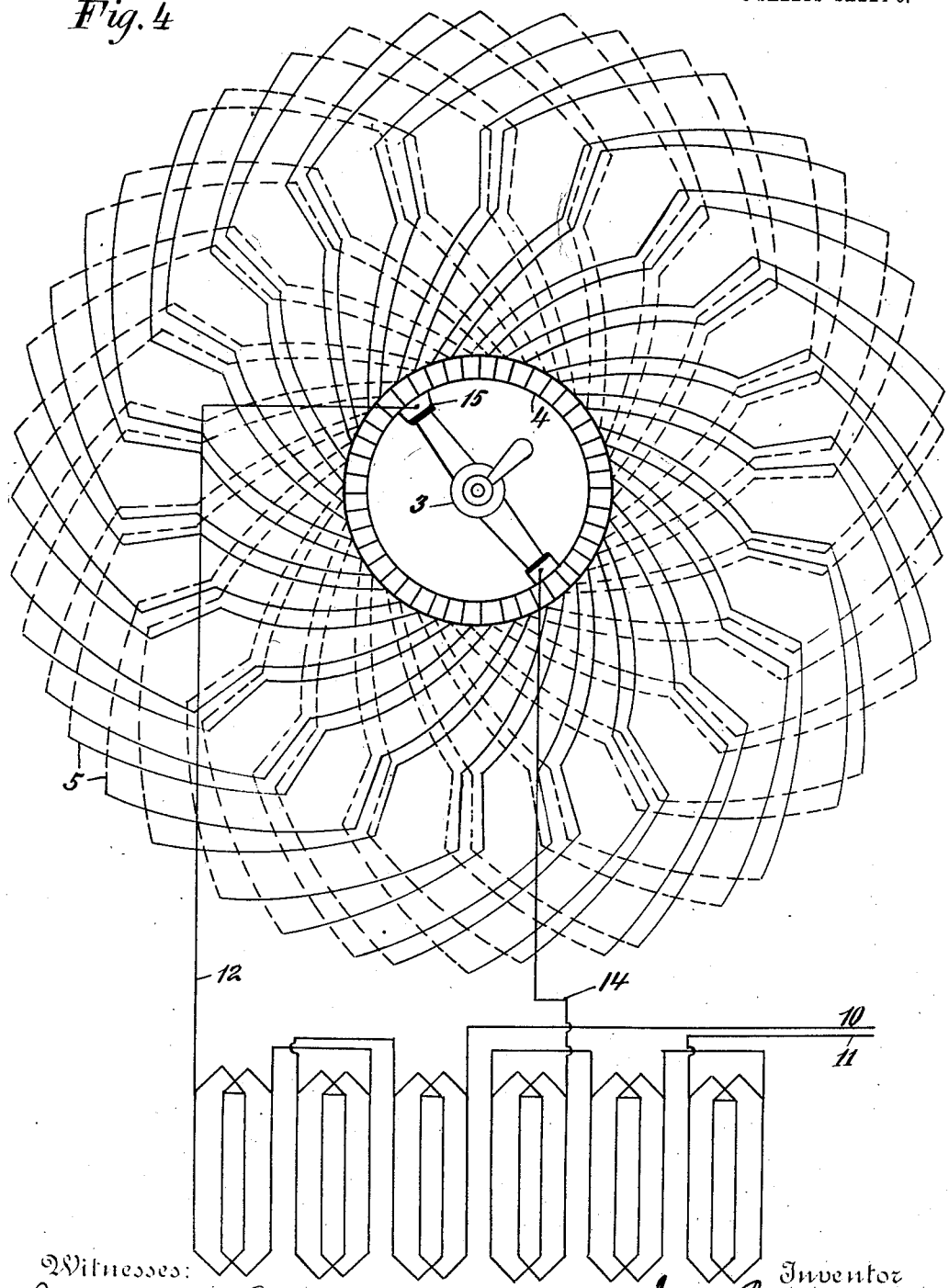

Figure 1 is a view showing the stator and frame in central vertical section, the rotor, commutator and brush elements being shown in elevation; Fig. 2 is a sectional view on the line 2—2 of Fig. 1; and Fig. 3 is a diagrammatic development of the stator winding and connections between the same and the brushes and terminals of the motor; Fig. 4 is a diagrammatic view of the motor windings.

My invention is not limited to motors of specific dimensions as a whole, or as regards the several parts, nor to materials and relative arrangements; the motor hereinafter described embodies the several principles of my invention in the best form which I have thus far been able to design, but in presenting these several features, I do not intend thereby to limit the scope of my invention.

As shown in the drawings, the rotor 1 comprises a laminated core 2 of magnetic material, said core being fixedly mounted on a shaft 3, the commutator being shown at 4. The laminae of core 2 are provided with openings at or near their periphery to form slots, which, in the present instance, are twenty-two in number, and in which are mounted the insulated conductors 5, constituting the coils of the armature winding. Each slot contains windings of two coils, the windings of one coil at the end of said slot passing in one direction and the windings of the second coil at the ends of said slot passing in the opposite direction as is clearly shown in Fig. 4. In the present instance, one coil passes from the first slot to the fourth slot, and the second coil passes an equal number of slots in the opposite direction, namely, from the first slot to the twentieth slot, and so on around the core; thus completing the arrangement of armature windings to be connected to form a series-wound armature. The winding diagram of the rotor is clearly illustrated in Fig. 4, which shows also the circuit relations of the rotor and stator.

As shown in Fig. 1, the slots in the armature core are disposed at a suitable angle to the axis of the armature core, which angle in the instance cited, is sufficient to bridge one stator tooth. This slant in the rotor core slots in relation to the field gives such uniform relationship as to assist in permitting a large range of flexibility in brush position without injurious sparking because of the gradual entrance of the rotor teeth into the fields of the stator, and thus assists in securing uniform action with either direct or alternating currents.

It is apparent that the core teeth will have an oblique approach to any of the field poles, and thereby less sudden reactions of the rotor and stator fluxes will result, preventing steep peaks of E. M. F. and therefore widening the area of brush adjustment without the production of excessive sparking or heating at the commutator.

In the specific motor illustrated, the stator 6 comprises a laminated frame 7 of magnetic material of uniform inner diameter, the core being built up of thin plates or laminae properly assembled, said plates being provided with openings at or near their inner periphery to form slots, which, in the present instance, are twenty-four in number. The insulated windings of the stator are mounted in said stator slots, as indicated in Fig. 3, to form two groups, each group comprising three pairs of series-connected coils, the coils being represented by the heavier lines. Taking any pair of coils, the windings of one coil, having a sufficient number of turns, may be placed in a first slot and a third slot, the windings of the other coil of the pair being placed in a second slot and a fourth slot. The connections (indicated by lighter lines) between the several pairs of coils in both groups is such as to give rise to alternate poles of reverse polarity, that is, in the present instance, a series of three form a north and three form a south pole and a stator tooth of neutral polarity will lie between said north and south poles. As will be evident from Figs. 2 and 3, the motor shown in the drawing has six field poles spaced at equal angles and produced by six groups of coils; as the stator has twenty-four teeth there will be six poles of three teeth each and six neutral teeth in which latter a weak distributed polar region will exist. Current is led to the commutator by two brushes 180° apart. Assuming a certain direction of current supply, the arrows indicate the path of the current. One terminal of each group of stator coils is brought out and connected to one terminal of the motor; in the present instance, the terminal 10 may be connected to one supply main, the terminal 11 being connected to the other supply main. The other terminals 12 and 14 are brought out and connected to the two brushes respectively to give a proper series connection of rotor and field windings.

I have found that the relationship of the number of armature turns to the number of stator turns is of great importance in attaining the objects of my invention, and that the armature turns should largely exceed the stator turns, and in my preferred form the armature turns are approximately twice the stator turns.

In the form of motor as described, and with the brushes placed in the neutral position, the speed of the motor when supplied with direct current is very largely in excess of the speed when alternating current is supplied of substantially the same voltage. If, however, the brushes be shifted backward as regards direction of rotation, the speed with direct current increases only slightly, and the speed with alternating current increases a comparatively large amount. Further backward shifting of the brushes similarly causes comparatively slight increase in speed with use of direct current, and a comparatively large amount with use of alternating current, until at a certain angle of retardation the speed will be substantially the same with either form of current with the same torque. In the form of motor particularly described above, the brush position, when substantially the same speed is obtained with either form of current, is at an angle of retardation of approximately fifty-five electrical degrees back of the neutral brush position, and substantially maximum efficiency is obtained in either case. In any of these brush positions, no injurious sparking occurs, and with proper position, as above explained, the motor may be used as a universal motor, the brushes being fixed at that point giving the same speed with either direct or alternating current of substantially the same voltage and with the same torque. The speed and the efficiency is also substantially independent of the frequency of the alternating current. If desired, the brushes may be initially set in this position when the motor will run at the same speed on commercial circuits carrying either alternating or direct current. With this form of motor, it will be seen that when used as an alternating current motor, the speed may be controlled as desired by merely shifting the brushes to a position corresponding with the desired speed, and that I thus secure a variable speed alternating current motor without the necessity of any auxiliary apparatus. At the usual position of highest speed and power of the motor when alternating current is used, a further backward movement results in a reduction of speed with an increase of current until at a brush position of ninety electrical degrees from the mechanical neutral point, the armature would be at rest, but with a very large current flowing and the motor would form practically a short circuit upon the line which would of course damage the motor. If, however, the brushes are moved from the position of highest speed and work in the same direction of rotation as the motor, the speed is reduced and the current consumption is also reduced, so that at a position of ninety electrical degrees in the forward direction from the mechanical neutral the motor comes to rest and an extremely small current flows through the motor due to the combining of the armature and stator field to present maximum self-induction. Still further movement of the brushes in the same direction results in the reversal of direction of rotation of the motor, so that continuing the movement of the brushes in the same direction now becomes a backward movement with reference to the rotation of the motor. If the direction of the brush movement be now continued in the same direction as before, but against the reverse movement of the motor, the speed will gradually increase until a position is reached where the speed and power become the same as at the original starting position referred to, but with the direction of rotation of the motor reversed. It will thus be understood that with the form of motor above described, the same is capable of extreme variations in speed in both directions when an alternating current is used and that the reversal of rotation is obtainable by merely shifting the brushes without the necessity of opening the motor circuit and without abnormal current flow or damage to the motor. In general, the complete reversal from any speed and power in one direction to the same speed and power with the motor reversed is accomplished by moving the brushes through the sum of one hundred and eighty degrees plus twice the angle of retardation.

It is important in this form of motor that all parts be rigidly supported and ample ventilation be obtained. I provide for this purpose a casing 20, which is of rectangular form, as more clearly shown in Fig. 2, and which envelops the circular exterior of the stator frame. The casing 20 is provided with large openings for securing ventilation, and engages the exterior of the stator frame only on four lines of contact, the laminæ of the stator being fixed to the casing by two screws 24. I mount the two brushes 15 on an annular ring 21, which is rotatably mounted on the stub 22 of the removable end frame 23. A handle 25 fixed to the ring 21 is provided for shifting the ring as desired and two stops 26 are located on the end frame 23 spaced apart an angular amount equal to 360 electrical degrees less the sum of 180 electrical degrees plus twice the predetermined angle of retardation for preventing an operator from rotating the brushes through a position on which would cause the motor to be damaged.

It will be understood that although I have shown and described a specific embodiment of my invention, yet my invention may be embodied in other forms of construction, and have other relationships than those particularly described.

Having thus described my invention, I declare that what I claim as new and desire to secure by Letters Patent, is:

1. In a commutator type of electric motor, the combination of a toothed stator having a winding producing distributed poles with intervening polar teeth of neutral polarity, and an armature connected in series with the winding of the stator and having a much greater number of turns, the armature windings being inclined to the armature axis, a commutator, and brushes displaced a large amount back of the neutral position to a point where the speed curves under applied alternating or direct current of the same voltage approach coincidence, whereby the motor may be operated efficiently under alternating or direct current of the same voltage.

2. In an electric motor for alternating or direct current, the combination of a toothed stator having a winding producing distributed poles with intervening neutral pole teeth, an armature, the armature and stator slots having an incommensurable relation, a commutator, and brushes bridging more than one commutator bar, said brushes being displaced a large amount back of the neutral position to a point where the speed curves under applied alternating or direct current of the same voltage approach coincidence, for securing approximately the same speed and torque under said alternating or direct current.

3. In an electric motor, the combination of a stationary field magnet having windings, an armature carrying a winding, a commutator, the field and armature windings being connected in series relation, the field poles having intervening pole teeth of low magnetization, and brushes displaced back of the neutral position to a point where the speed curves under applied alternating or direct current of the same voltage approach coincidence, whereby approximately the same torque and speed are maintained under either of said currents.

4. In an electric motor, the combination of a stator having distributed windings, a commutator, a series wound armature having the conductors inclined with respect to the armature axis, the number of armature turns being largely in excess of the number of stator turns, the field slots being incommensurable with the armature slots, and brushes located back of the neutral position by an amount determined by approximate coincidence of the speed curves under alternating or direct current of the same voltage, whereby approximately the same speed and torque are maintained with either current.

5. In an alternating current motor, the combination of a stator having distributed windings, a toothed armature having its windings connected in series with the stator winding, a commutator, the number of armature turns being largely in excess of stator turns, and two brushes each bridging more than one commutator bar adjusted to a line of commutation where the speed curves under alternating or direct current of the same voltage approach coincidence, whereby approximately the same speed and torque are maintained under either current.

6. A combined alternating and direct current motor, provided with distributed windings to produce coöperative poles in the two members, the field poles having intervening polar projections of low magnetization, said motor having its brushes located at a point rearward of the neutral point for direct current by an amount determined by approximate coincidence of the speed curves under the same alternating or direct current voltage applied to the motor terminals.

7. A combined alternating and direct current motor, provided with a winding on each of its two members, the interior winding having a large number of turns relatively to the exterior winding, a commutator provided with brushes set in a position where the speed curves under a definite alternating and direct current voltage applied to the motor terminals are in approximate coincidence.

8. A combined alternating and direct current motor, provided with a commutator and windings to produce coöperative poles in its two members, the field poles having intervening salient pole teeth of neutral polarity, the interior winding having a large number of turns relatively to the exterior winding, a commutator, and brushes therefor set at a point in which the speed curves under applied alternating or direct current of definite voltage approximate coincidence.

9. A combined alternating and direct current motor, provided with a commutator and distributed windings to produce coöperative poles on its two members, brushes bearing on the commutator located at a point where the speed curves under definite applied alternating or direct current voltage approach coincidence, said brushes spanning two commutator bars to short circuit a coil.

10. A combined alternating and direct current motor, provided with a stator having a winding producing distributed poles, a rotor having its core slots lying at an angle to the shaft, the rotor having a large number of turns relatively to the stator, a commutator, and brushes applied thereto set at a point of approximate coincidence of the motor speed curves under applied alternating or direct current of the same voltage.

In testimony whereof I affix my signature, in presence of two witnesses.

JAMES BURKE.

Witnesses:
L. K. SAGER,
GEO. N. KERR.